United States Patent
Devarakonda et al.

(10) Patent No.: US 10,526,947 B2
(45) Date of Patent: Jan. 7, 2020

(54) EXHAUST AFTERTREATMENT SYSTEM

(71) Applicant: AI ALPINE US BIDCO INC, Wilmington, DE (US)

(72) Inventors: Maruthi Narasinga Rao Devarakonda, Waukesha, WI (US); Srinivas Kandasamy, Bangalore (IN); Michael Url, Garching BY (DE); Herbert Kopecek, Jenbach (AT)

(73) Assignee: AI ALPINE US BIDCO INC, Wilmington, DE (US)

( * ) Notice: Subject to any disclaimer, the term of this patent is extended or adjusted under 35 U.S.C. 154(b) by 0 days.

(21) Appl. No.: 15/951,272

(22) Filed: Apr. 12, 2018

(65) Prior Publication Data

US 2019/0316506 A1 Oct. 17, 2019

(51) Int. Cl.
| | |
|---|---|
| F01N 3/10 | (2006.01) |
| F01N 3/20 | (2006.01) |
| F01N 11/00 | (2006.01) |
| F01N 13/00 | (2010.01) |
| B01D 53/94 | (2006.01) |

(52) U.S. Cl.
CPC ........... *F01N 3/208* (2013.01); *B01D 53/944* (2013.01); *B01D 53/9418* (2013.01); *B01D 53/9431* (2013.01); *B01D 53/9436* (2013.01); *B01D 53/9477* (2013.01); *B01D 53/9495* (2013.01); *F01N 3/106* (2013.01); *F01N 11/007* (2013.01); *F01N 13/009* (2014.06); *F01N 2610/02* (2013.01); *F01N 2610/146* (2013.01); *F01N 2610/148* (2013.01); *F01N 2900/0408* (2013.01); *F01N 2900/0416* (2013.01)

(58) Field of Classification Search
CPC ............ B01D 53/9418; B01D 53/9431; B01D 2257/402; B01D 2257/404; B01D 2258/012
See application file for complete search history.

(56) References Cited

U.S. PATENT DOCUMENTS

| | | | |
|---|---|---|---|
| 9,243,534 B2 | 1/2016 | Devarakonda | |
| 2009/0133384 A1 | 5/2009 | Devarakonda et al. | |
| 2013/0232958 A1* | 9/2013 | Ancimer | F01N 3/208 60/301 |
| 2014/0147339 A1* | 5/2014 | Ardanese | B01D 53/9445 422/119 |
| 2015/0113962 A1 | 4/2015 | Devarakonda | |
| 2016/0279574 A1 | 9/2016 | Devarakonda | |
| 2017/0138244 A1 | 5/2017 | Srinivasan et al. | |
| 2017/0175604 A1 | 6/2017 | Devarakonda et al. | |

(Continued)

FOREIGN PATENT DOCUMENTS

WO 2009070734 A1 6/2009

*Primary Examiner* — Timothy C Vanoy
(74) *Attorney, Agent, or Firm* — Fletcher Yoder, P.C.

(57) ABSTRACT

The present application provides an aftertreatment system for treating an exhaust stream of an engine. The aftertreatment system may include a selective catalyst reduction system positioned downstream of the engine, a secondary catalyst positioned downstream of the selective catalyst reduction system, a first gas sensor positioned between the engine and the selective catalyst reduction system, a second gas sensor positioned between the selective catalyst reduction system and the secondary catalyst, and a third gas sensor positioned downstream of the secondary catalyst.

23 Claims, 2 Drawing Sheets

(56) References Cited

U.S. PATENT DOCUMENTS

| | | |
|---|---|---|
| 2017/0175610 A1 | 6/2017 | Devarakonda et al. |
| 2017/0175645 A1 | 6/2017 | Devarakonda et al. |
| 2017/0211468 A1 | 7/2017 | Devarakonda et al. |
| 2017/0218813 A1* | 8/2017 | Nilsson .................. F01N 3/021 |
| 2017/0218828 A1* | 8/2017 | Schweizer ............ F01N 13/009 |
| 2018/0056238 A1 | 3/2018 | Caruso et al. |
| 2018/0058698 A1 | 3/2018 | Czarnecki |
| 2019/0010852 A1* | 1/2019 | Quigley .................. F01N 11/00 |
| 2019/0136732 A1* | 5/2019 | Lauritano ............... F01N 3/208 |

* cited by examiner

EXHAUST AFTERTREATMENT SYSTEM

TECHNICAL FIELD

The present application and the resultant patent relate generally to gas engines and more particularly relate to an exhaust aftertreatment system having sensors for estimating exhaust parameters as the exhaust stream passes through a selective catalyst reduction system and a secondary catalyst such as an oxidation catalyst or an ammonia slip catalyst.

BACKGROUND OF THE INVENTION

Lean-burn engines, such as those used by diesel-powered and natural gas-powered vehicles, equipment, and generators combust at high air-to-fuel ratios in comparison with rich-burn engines. By nature, lean-burn engines use less fuel while producing equivalent power of similar-sized rich-burn engines. However, lean-burn engines have increased $NO_X$ and $NH_3$ emissions generally due to the slow burn rates associated with the lean mixtures of fuel (i.e., excess air introduced with the fuel). Exhaust aftertreatment systems are typically used to reduce $NO_X$ and $NH_3$ emissions from the exhaust of the lean-burn engines.

Generally described, the aftertreatment systems may include a selective catalyst reduction system. The selective catalyst reduction system adds a reductant, typically ammonia or urea, to the combustion gas stream before passing the stream through a catalyst bed so as to absorb selectively the nitrogen oxides and the reducing agent. The absorbed components undergo a chemical reaction on the catalyst surface and the reaction products are desorbed. Specifically, the reactant reacts with the nitrogen oxides in the combustion gas stream to form water and nitrogen. The aftertreatment systems also may include a secondary oxidation catalyst. The secondary catalyst may include of a substrate made up of numerous small channels coated with a porous layer containing catalysts (e.g., platinum, palladium). As the exhaust gases traverse the channels, certain chemicals (e.g., carbon monoxide (CO), hydrocarbon (HC)) may react with oxygen to form carbon dioxide ($CO_2$) and water vapor. Other types of catalysts and other types of reductants may be used herein.

Typical aftertreatment system, particularly for lean burn engines, may have certain limitations because any $NH_3$ that slips from the selective catalyst reduction system may be oxidized back into NOx, defeating the purpose of the NOx aftertreatment. Careful metering and distribution of the reductant to the selective catalyst reduction system may be require to convert and remove a sufficient level of the nitrogen oxides and the like. Moreover, NOx, $NH_3$, CO, and HCHO emissions may change significantly across the aftertreatment system due to coupled reactions occurring in the secondary catalyst, especially as the catalysts age. Proper monitoring of the reductant used in the aftertreatment system thus is required for both efficient operation and emissions compliant operation.

SUMMARY OF THE INVENTION

The present application and the resultant patent provide an aftertreatment system for treating an exhaust stream of an engine such as a lean burn engine. The aftertreatment system may include a selective catalyst reduction system positioned downstream of the engine, a secondary catalyst positioned downstream of the selective catalyst reduction system, a first gas sensor positioned between the engine and the selective catalyst reduction system, a second gas sensor positioned between the selective catalyst reduction system and the secondary catalyst, and a third gas sensor positioned downstream of the secondary catalyst.

The present application and the resultant patent further provide a method of determining an optimal flow rate of a reductant in an aftertreatment system for an exhaust stream of an engine. The method may include the steps of receiving a first input from a first gas sensor positioned between the engine and a selective catalyst reduction system, receiving a second input from a second gas sensor positioned between the selective catalyst reduction system and a secondary catalyst, receiving a third input from a third gas sensor positioned downstream of the secondary catalyst, estimating a first change in the exhaust steam between the first gas sensor and the second gas sensor, estimating a second change in the exhaust stream between the second gas sensor and the third gas sensor, and varying a flow rate of a reductant to the selective catalyst reduction system based upon the first change and the second change.

The present application and the resultant patent further provide an aftertreatment system for treating an exhaust stream of a lean burn engine. The aftertreatment system may include a selective catalyst reduction system with an injector for a stream of a reductant positioned downstream of the lean burn engine, a secondary catalyst positioned downstream of the selective catalyst reduction system, a first gas sensor positioned between the engine and the selective catalyst reduction system, a second gas sensor positioned between the selective catalyst reduction system and the secondary catalyst, a third gas sensor positioned downstream of the secondary catalyst, and a controller in communication with the first gas sensor, the second gas sensor, the third gas sensor, and the injector.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
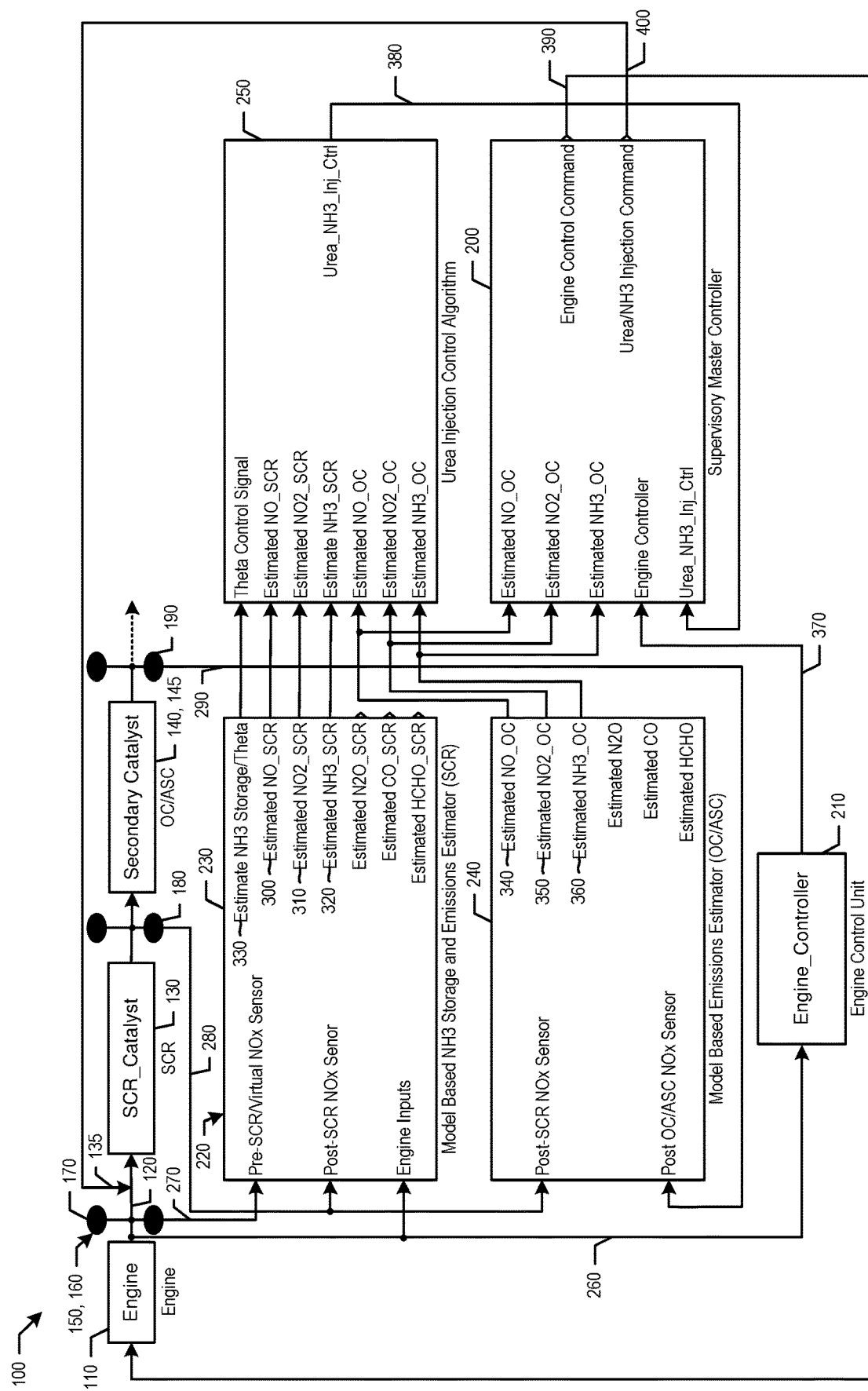
FIG. 1 is a schematic diagram of an aftertreatment system for a lean burn engine as may be described herein.

Referring now to the drawings, in which like numerals refer to like elements throughout the several views, FIG. 1 is a schematic diagram of an aftertreatment system 100 as may be described herein for use with a gas engine 110. The gas engine 110 may be a lean burn engine such as a diesel engine or a natural gas engine. As used herein, a lean burn engine is any combustion system that may have excess air or other diluents relative to the amount of fuel being combusted. Although the description that follows pertains to a gaseous reductant injection control system for exhaust aftertreatment in a gas engine such as a lean burn engine, it should be understood that the various embodiments herein may be suitable for use with any lean burn combustion machine, including both stationary and mobile combustion machines, where exhaust is treated for emissions such as $NO_X$ and $NH_3$. Examples include lean burn gaseous-fueled reciprocating engines, lean burn liquid-fueled reciprocating engines such as diesel engines or other compression ignition or spark ignition engines, or gas turbines, i.e., automotive, on-highway truck, off highway, locomotive, power generation, gas compression, and the like. The engine 110 may produce an exhaust stream 120 of gases that may contain nitrogen oxides ($NO_X$) including NO, and $NO_2$, $NH_3$, and the like.

The aftertreatment system 100 may include a selective catalyst reduction system 130. The selective catalyst reduction system 130 may be positioned downstream of the engine 110. The selective catalyst reduction system 130 may include a gaseous reductant injector 135 for injecting a gaseous reductant into the exhaust stream 120. For example, the gaseous reductant injector 135 may be a urea solution injector to inject a solution of urea ($NH_2CONH_2$) into the exhaust stream 120. Alternatives include liquid or solid state ammonia. Other types of reductants may be used herein.

The selective catalyst reduction system 130 further may include a catalyst therein. The catalyst may contain metal zeolites arranged in a honeycomb such that the passing exhaust gasses will interact with a multitude of catalytic sites. Once inside catalyst, the nitrogen oxides within the exhaust stream 120 may react with $NH_3$ in the presence of the metal zeolite to produce a nitrogen gas ($N_2$) and water vapor. Other types of catalysts may be used herein.

The aftertreatment system 100 further may include a secondary catalyst 140. The secondary catalyst 140 may be positioned downstream of the selective catalyst reduction system 130. The secondary catalyst 140 may convert any excess $NH_3$ to $N_2$ so as to prevent oxidation back to $NO_X$. The secondary catalyst 140 may be an oxidation catalyst 145 and the like. Other types of catalysts may be used herein. For example, as explained below, an ammonia slip catalyst and the like may be used. Given the use of the lean burn engine 110, the secondary catalyst 140 is positioned downstream of the selective catalyst reduction system 130 because the $NO_2/NO_X$ ratio may be greater than about 0.5. (By contrast, diesel engines may use a catalyst upstream of the selective catalyst system to increase the $NO_2/NO_X$ ratio to close to about 0.5 before the exhaust stream enters the selective catalyst reduction system.)

The aftertreatment system 100 may include a number of gas sensors 150. The gas sensors 150 may include $NO_X$ sensors 160. The gas sensors 150 also may include $NH_3$ sensors and the like. The gas sensors 150 may be of conventional design. Other types of sensors may be used herein. In this example, a set of engine exhaust sensors 170 may be positioned downstream of the engine 110, a set of selective catalyst reduction sensors 180 may be positioned downstream of the selective catalyst reduction system 130, and a set of secondary catalyst sensors 190 may be positioned downstream of the secondary catalyst 140. Other locations may be used herein. The gas sensors 150 thus determine the concentration of NO, $NO_2$, $NH_3$, and the like in the exhaust stream 120 at these different locations. Other components and other configurations also may be used herein.

Operation of the aftertreatment system 100 may be governed by a master controller 200. The processing operations performed by the master controller 200 may be implemented in the form of hardware embodiment and/or both hardware and software. For example, a single special-purpose integrated circuit, such as an application specific integrated circuit (ASIC), having a main or central processor section for overall, system-level control, and separate sections dedicated to performing various different specific combinations, functions and other processes under control of the central processor section, can be used. The master controller 200 also may be implemented using a suitably programmed general-purpose computer, such as a microprocessor or microcontroller, or other process device such as a central processing unit (CPU) or microprocessor unit (MPU), either alone or in conjunction with one or more peripheral data and signal processing devices. In general, any device or similar devices on which a finite state machine capable of implementing logic flow that represents the various process functions performed by the controller 200 may be used. The master controller 200 also may be implemented using a variety of separate dedicated or programmable integrated or other electronic circuits or devices, such as hardwired electronic or logic circuits, including discrete element circuits or programmable logic devices such as programmable logic devices (PLDs), programmable array logic devices (PALs), programmable logic arrays (PLAs), or the like.

The processing functions performed by the master controller 200 also may be implemented in software, which includes but is not limited to firmware, resident software, microcode, etc. Furthermore, the processing functions performed by the master controller 200 can take the form of a computer program product accessible from a computer-usable or computer-readable medium providing program code for use by or in connection with a computer or any instruction execution system (e.g., processing units). For the purposes of this description, a computer-usable or computer readable medium may be any computer readable storage medium that can contain or store the program for use by or in connection with the computer or instruction execution system.

The computer readable medium may be an electronic, magnetic, optical, electromagnetic, infrared, or semiconductor system (or apparatus or device). Examples of a computer-readable medium include a semiconductor or solid-state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

In addition to the master controller 200, the engine 110 also may include an engine controller 210. The engine controller 210 may be similar to the master controller 200. The functionality of the master controller 200 and the engine controller 210 may reside on the same or different devices. Other components and other configurations may be used herein.

The master controller 200 may include one or more estimators 220 or observers that may receive the gas concentrations detected in the exhaust stream 120 by the gas sensors 150 and the operating conditions detected by engine controller 210. Based upon this data, the master controller 200 then may estimate the concentrations of NO, $NO_2$, and $NH_3$ therein. The estimators 220 thus may include a selective catalyst reduction estimator 230 that models the catalytic reactions in the selective catalyst reduction system 130 in realtime and a secondary catalyst estimator 240 that models the catalytic reactions in the secondary catalyst 140 in realtime. The estimators 220 may be of conventional design and may use principles based in control and linear system theory. Specifically, the estimators 160 may estimate the concentrations of NO and $NO_2$ in the exhaust stream 120 because the math-based selective catalyst reduction and secondary catalyst models model the relevant species concentration (NO, $NO_2$, $NH_3$) based on conservation of species, mass transfer, and reaction chemistry. Other components and other configurations may be used herein.

The master controller 200 further may include a control algorithm 250 that may receive the NO, $NO_2$, and $NH_3$ concentration estimates from the estimators 220. Based upon this data, the control algorithm 250 then may determine the flow rate of the gaseous reductant (e.g., urea solution) to be injected into the exhaust stream 120 by the gaseous reductant injector 135 of the selective catalyst reduction system 130. Specifically, the control algorithm 165 may determine an optimal amount of the gaseous reductant that should be added to minimize $NO_X$ and $NH_3$ emissions in the exhaust stream 120 without sacrificing engine efficiency. In this manner, the master controller 200, via the control algorithm 250, may be used to increase or decrease the amount of gaseous reductant (e.g., urea) injected into the exhaust stream 120. Other components and other configurations may be used herein.

In use, different types of engine inputs 260 may be provided to the engine controller 210 and the selective catalyst reduction estimator 230. These inputs may include flow rate, load, temperature, and the like. Engine exhaust sensor inputs 270 may be provided by the engine exhaust sensors 170 to the selective catalyst reduction estimator 230 on the gas concentrations in the exhaust stream 120 leaving the engine 110. Selective catalyst reduction inputs 280 may be provided by the selective catalyst reduction sensors 180 to the selective catalyst reduction estimator 230 and the secondary catalyst estimator 240 on the gas concentrations leaving the selective catalyst reduction system 130. Secondary catalyst inputs 290 may be provided by the secondary catalyst sensors 190 to the secondary catalyst estimator 240 on the gas concentrations leaving the secondary catalyst 140.

Based upon the engine inputs 260, the engine exhaust sensor inputs 270, and the selective catalyst reduction inputs 280, the selective catalyst reduction estimator 230 may determine an estimated selective catalyst reduction change in NO 300, an estimated selective catalyst reduction change in $NO_2$ 310, and an estimated selective catalyst reduction change in $NH_3$ 320. The selective catalyst reduction estimator 230 may provide these estimates to the control algorithm 250 along with an estimated $NH_3$ storage/Theta control signal 330. The selective catalyst reduction estimator 230 also may determine changes in $N_2O$, CO, HCHO, and the like. Based upon the selective catalyst reduction inputs 280 and the secondary catalyst inputs 290, the secondary catalyst estimator 240 may determine an estimated secondary catalyst change in NO 340, an estimated secondary catalyst change in $NO_2$ 350, and an estimated secondary catalyst change in $NH_3$ 360. The secondary catalyst estimator 240 may provide these estimates to the control algorithm 250 as well to the master controller 200. The secondary catalyst estimator 240 also may determine changes in $N_2O$, CO, HCHO, and the like. The engine controller 210 also provides an engine control signal 370 to the master controller 200. Other signals and other inputs may be used herein.

The control algorithm 250 thus uses these inputs of the changes in the gas concentrations over the selective catalyst reduction system 130 and the secondary catalyst 140 to determine a reductant control signal 380 representative of the optimal flow rate of the reductant for optimal efficiency and minimal emissions. The control algorithm 250 provides the reductant control signal 380 to the master controller 200. The master controller 200 uses the changes in the gas concentrations over the secondary catalyst 140, the engine control signal 370, and the reductant control signal 380 to determine a reductant command signal 390 representing the desired reductant flow rate to the injector 135 and an engine command signal 400 representing the desired operating parameters to the engine 110.

The use of the selective catalyst reduction sensors 180 between the selective catalyst reduction system 130 and the secondary catalyst 140 as well as the secondary catalyst sensors 190 downstream of the secondary catalyst 140 thus provide the ability to estimate overall $NO_X$ and $NH_3$ concentration precisely. The selective catalyst reduction sensors 180 enable the estimation of $NH_3$ storage and emissions downstream of selective catalyst reduction system 130 and the secondary catalyst sensors 190 enable the estimation of emissions downstream of the secondary catalyst 140. This continuous input is valuable because $NO_X$, $NH_3$, CO, and HCHO emissions may change significantly across the aftertreatment system 100 due to coupled reactions occurring in the secondary catalyst, especially as the catalysts age. The master controller 200 thus may consider these critical inputs from the virtual sensors for optimal engine operation.

Figure 2:
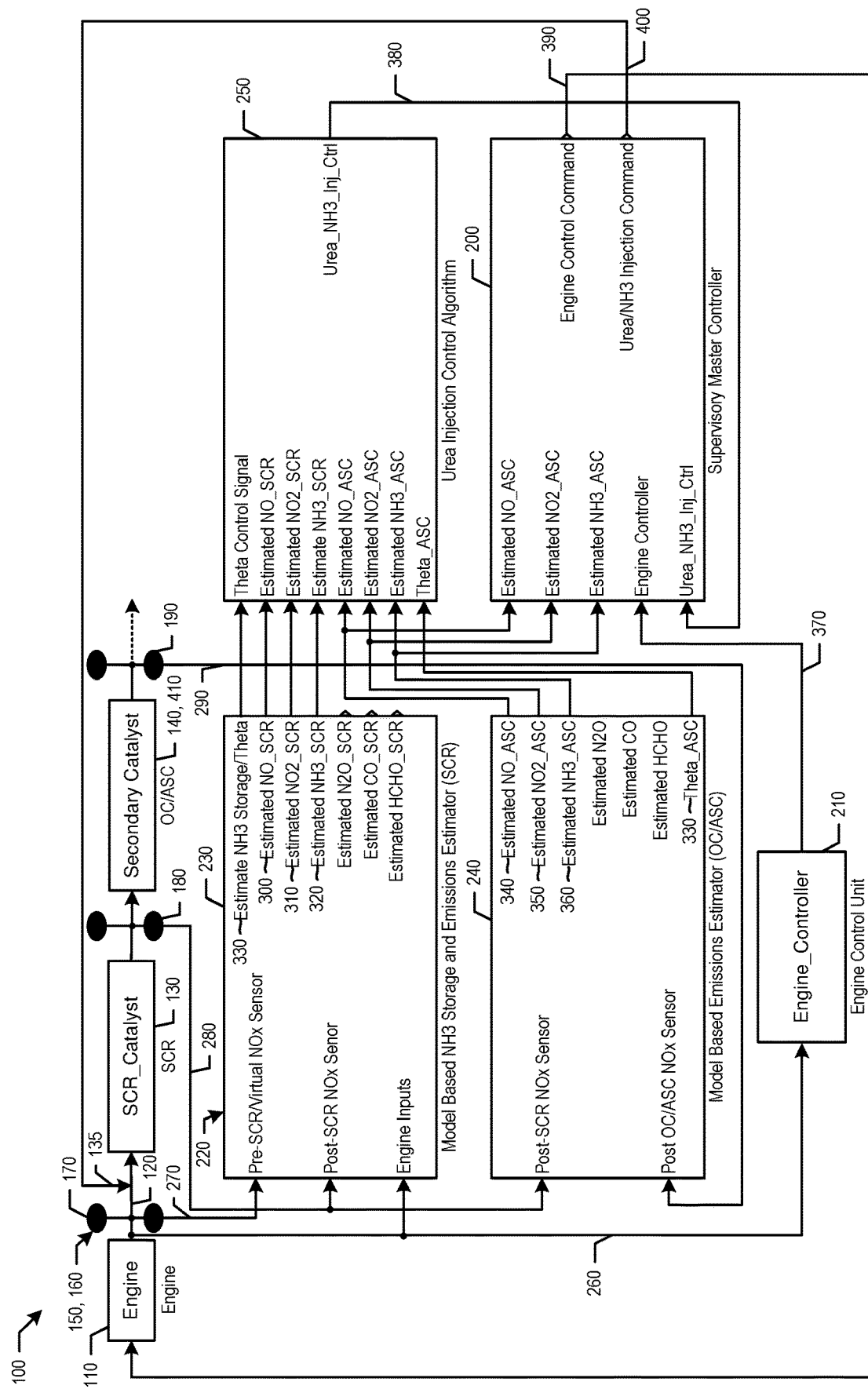
FIG. 2 is a schematic diagram of an alternative embodiment of an aftertreatment system for a lean burn engine as may be described herein.

FIG. 2 shows an alternative embodiment of an aftertreatment system 410 as may be described herein. In this example, the secondary catalyst 140 may include an ammonia slip catalyst 410 and the like. The ammonia slip catalyst 410 may include a zeolite layer and the like to store ammonia. The ammonia slip catalyst 410 may be used instead of the oxidation catalyst 140 for good nitrogen oxide conversion across the aftertreatment system while maintaining high efficiency during transient engine operation. An estimated theta 330 may be sent to the injection controller 135 and the injector 135 may take a 'weighted' average of theta estimates from the estimators 230, 240 that accounts for surface coverage of ammonia (theta) in both selective catalyst reduction system and the ammonia slip catalyst. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An aftertreatment system for treating an exhaust stream of an engine, comprising:
   a selective catalyst reduction system positioned downstream of the engine;
   a secondary catalyst positioned downstream of the selective catalyst reduction system;
   a first gas sensor positioned between the engine and the selective catalyst reduction system;
   a second gas sensor positioned between the selective catalyst reduction system and the secondary catalyst; and
   a third gas sensor positioned downstream of the secondary catalyst, wherein at least the second gas sensor and the third gas sensor obtain sensor input to determine concentrations of ammonia ($NH_3$) in the exhaust stream.

2. The aftertreatment system of claim 1, wherein the first gas sensor, the second gas sensor, and the third gas sensor comprise nitrogen oxide sensors.

3. The aftertreatment system of claim 1, wherein the first gas sensor, the second gas sensor, and the third gas sensor determine concentrations of nitric oxide (NO), nitrogen dioxide ($NO_2$), and ammonia ($NH_3$) in the exhaust stream.

4. The aftertreatment system of claim 1, wherein the first, second, and third gas sensors obtain sensor input to determine concentrations of ammonia ($NH_3$) in the exhaust stream.

5. The aftertreatment system of claim 1, wherein the selective catalyst reduction system comprises an injector for a stream of a reductant, and the reductant comprises urea or ammonia.

6. The aftertreatment system of claim 1, wherein the selective catalyst reduction system comprises an injector for a stream of a reductant, further comprising a controller and wherein the controller is in communication with the first gas sensor, the second gas sensor, the third gas sensor, and the injector.

7. The aftertreatment system of claim 6, wherein the controller varies a flow rate of the stream of the reductant based upon inputs from the first gas sensor, the second gas sensor, and the third gas sensor.

8. The aftertreatment system of claim 6, further comprising a selective catalyst reduction estimator in communication with the controller, the first gas sensor, and the second gas sensor so as to determine changes in the exhaust stream over the selective catalyst reduction system.

9. The aftertreatment system of claim 8, wherein the selective catalyst reduction estimator determines changes in the concentrations of nitric oxide (NO), nitrogen dioxide ($NO_2$), and ammonia ($NH_3$) in the exhaust stream and surface coverage of ammonia (theta).

10. The aftertreatment system of claim 8, further comprising a secondary catalyst estimator in communication with the controller, the second gas sensor, and the third gas sensor so as to determine changes in the exhaust stream over the secondary catalyst.

11. The aftertreatment system of claim 10, wherein the secondary catalyst estimator determines changes in the concentrations of nitric oxide (NO), nitrogen dioxide ($NO_2$), and ammonia ($NH_3$) in the exhaust stream and surface coverage of ammonia (theta).

12. The aftertreatment system of claim 6, further comprising a control algorithm in communication with the controller, the selective catalyst reduction estimator, and the secondary catalyst estimator to determine a flow rate for the stream of the reductant.

13. The aftertreatment system of 12, wherein the controller sends a reductant command signal to the injector with the flow rate for the stream of the reductant.

14. The aftertreatment system of claim 1, wherein the secondary catalyst comprises an oxidation catalyst or an ammonia slip catalyst.

15. The system of claim 1, wherein the first gas sensor comprises a first NOx sensor and a first ammonia ($NH_3$) sensor, the second gas sensor comprises a second NOx sensor and a second ammonia ($NH_3$) sensor, and the third gas sensor comprises a third NOx sensor and a third ammonia ($NH_3$) sensor.

16. A method determining a flow rate of a reductant in an aftertreatment system for an exhaust stream of an engine, comprising:
receiving a first input from one or more first gas sensors positioned between the engine and a selective catalyst reduction system to determine a first concentration of ammonia ($NH_3$) and a first concentration of NOx in the exhaust stream;
receiving a second input from one or more second gas sensors positioned between the selective catalyst reduction system and a secondary catalyst to determine a second concentration of ammonia ($NH_3$) and a second concentration of NOx in the exhaust stream;
receiving a third input from one or more third gas sensors positioned downstream of the secondary catalyst to determine a third concentration of ammonia ($NH_3$) and a third concentration of NOx in the exhaust stream;
estimating a first change in the exhaust steam between the first gas sensor and the second gas sensor;
estimating a second change in the exhaust stream between the second gas sensor and the third gas sensor; and
varying a flow rate of a reductant to the selective catalyst reduction system based upon the first change and the second change.

17. An aftertreatment system for treating an exhaust stream of a lean burn engine, comprising:
a selective catalyst reduction system positioned downstream of the lean burn engine;
the selective catalyst reduction system comprising an injector for a stream of a reductant;
a secondary catalyst positioned downstream of the selective catalyst reduction system;
a first gas sensor positioned between the engine and the selective catalyst reduction system;
a second gas sensor positioned between the selective catalyst reduction system and the secondary catalyst;
a third gas sensor positioned downstream of the secondary catalyst; and
a controller in communication with the first gas sensor, the second gas sensor, the third gas sensor, and the injector, wherein the controller receives sensor input from at least the second gas sensor and the third gas sensor to determine concentrations of ammonia ($NH_3$) in the exhaust stream.

18. The aftertreatment system of claim 17, wherein the controller varies a flow rate of the stream of the reductant based upon inputs from the first gas sensor, the second gas sensor, and the third gas sensor.

19. The aftertreatment system of claim 17, further comprising a selective catalyst reduction estimator in communication with the controller, the first gas sensor, and the second gas sensor so as to determine changes in the exhaust stream over the selective catalyst reduction system.

20. The aftertreatment system of claim 19, further comprising a selective catalyst estimator in communication with the controller, the second gas sensor, and the third gas sensor so as to determine changes in the exhaust stream over the secondary catalyst.

21. The aftertreatment system of claim 20, further comprising a control algorithm in communication with the controller, the selective catalyst reduction estimator, and the secondary catalyst estimator to determine a flow rate for the stream of the reductant.

22. The system of claim 17, wherein the controller receives sensor input from the first, second, and third gas sensors to determine concentrations of ammonia ($NH_3$) in the exhaust stream.

23. The system of claim 17, wherein the first gas sensor comprises a first NOx sensor and a first ammonia ($NH_3$) sensor, the second gas sensor comprises a second NOx sensor and a second ammonia ($NH_3$) sensor, and the third gas sensor comprises a third NOx sensor and a third ammonia ($NH_3$) sensor.

* * * * *